United States Patent [19]

Harada et al.

[11] Patent Number: 4,954,863
[45] Date of Patent: Sep. 4, 1990

[54] IMAGE FORMING APPARATUS

[75] Inventors: Hiroyuki Harada, Sakai; Tetsuji Kajitani, Kawanishi, both of Japan

[73] Assignee: Mita Industrial Co., Ltd., Osaka, Japan

[21] Appl. No.: 271,316

[22] Filed: Nov. 15, 1988

[30] Foreign Application Priority Data

Nov. 19, 1987 [JP] Japan ................................. 62-292844
Nov. 19, 1987 [JP] Japan ................................. 62-292845
Nov. 19, 1987 [JP] Japan ................................. 62-292846

[51] Int. Cl.$^5$ ............................................. G03B 27/34
[52] U.S. Cl. ........................................ 355/51; 355/56; 355/235
[58] Field of Search ................. 355/51, 55, 56, 75, 355/235

[56] References Cited

U.S. PATENT DOCUMENTS

| | | | |
|---|---|---|---|
| 4,561,774 | 12/1985 | Takahashi et al. | 355/75 |
| 4,568,171 | 2/1986 | Ikenoue | 355/235 |
| 4,693,595 | 9/1987 | Kunikawa et al. | 355/51 X |
| 4,731,657 | 3/1988 | Miyagi | 318/560 |

Primary Examiner—L. T. Hix
Assistant Examiner—D. Rutledge
Attorney, Agent, or Firm—Beveridge, DeGrandi & Weilacher

[57] ABSTRACT

An image forming apparatus includes a movable optical system for reading an original image, a motor for driving the optical system, a motor driving circuit, an encoder which outputs signals responsive to velocities of the motor, a control circut which controls the motor driving circuit such that the optical system starts from a home position and turns at a predetermined point to return again to the home position, and applies braking to the motor when the optical system is stopped at the home position, and a microcomputer for deciding timing to apply braking in response to an output of the encoder. By deciding brake timing in response to the output of the encoder, the optical system can be stopped accurately at the home position even when a moving load is abnormally increased due to stains on component members forming a running path for the optical system, or due to replacement of the optical system.

17 Claims, 8 Drawing Sheets

IMAGE FORMING APPARATUS

BACKGROUND OF THE INVENTION

1. Field of the Invention

The present invention relates to an image forming apparatus such as an electrophotographic copying machine, printer and the like, particularly, it relates to braking of a running member of an optical system or the like which reads an original image.

2. Description of the Prior Art

A general electrophotographic copying machine will be explained according to FIGS. 12 and 13. In FIG. 12, a photoreceptor drum (1) which rotates at a constant velocity is made of a drum base formed with such a material as aluminum and is provided with a photoreceptor material from the selenium group on its surface. Around the drum (1) in its rotational direction, there are provided a main charger (2), an exposer (3), a light emitting diode (hereinafter, referred to as LED) (5) for partial image erasing, a developer (6), a transferrer (7), a separator (8), a cleaner (10) and a discharger (11) in succession. In the charger (2), a charge wire (2b) formed with a fine tungsten wire disposed in a U-shaped case (2a) is brought close to and along the surface of the photoreceptor drum (1) axially. A voltage of about 5-6 kV is usually applied to the charge wire (2b), thereby the surface of the photoreceptor drum (1) is charged to about 600-800 V.

LED (5) is used when part of a latent image has to be erased but is not used normally The developer (6) supplies a developer consisting of a carrier (iron filings) and toner supplied from a hopper (12) via a toner supply roller (13) constituted by a sponge roller or the like, to the surface of a developing roller (15) after the developer stirred by a stirring roller (14). The toner sticks to the surface of the photoreceptor drum (1) in response to the electrostatic latent image, thereby an actual image is formed. The toner forming the actual image is transferred to a paper fed through a resist roller (16) at the transferrer (7). The separator (8) serves to separate the transferred paper from the drum (1) by applying an AC electric field to the drum to release an electrostatic force between the drum (1) and the paper.

The transferrer (7) and separator (8) include charge wires (7b), (8b) respectively.

After the paper is separated, the drum surface is cleaned at the cleaner (10) by scraping the toner with a blade (17) made with a rubber material, and further the electric charge is removed therefrom in the following discharger (11) by receiving light from a discharge lamp (18).

Numeral (19) denotes a lighting unit including an exposure lamp (20), an oval reflector (21), an auxiliary reflector (22) and a first reflecting mirror (23), which moves toward the right in FIG. 12 at a velocity V when scanning an original (24). Numeral (25) indicates a mirror unit having second and third reflecting mirrors (26), (27), which moves toward the right in FIG. 12 at a velocity of V/2 when scanning the original (24), and serves to keep the length of the light path always constant with respect to the photoreceptor drum (1). The lighting unit (19) and mirror unit (25) constitute a running optical system (28). Numeral (29) indicates a frame of the electrophotographic copying machine, (30) is a contact glass, (31) is an original cover member and (32) is a buffer comprising a sponge and the like mounted under the original cover member (31).

Light emitted from the exposure lamp (20) is reflected at the original (24) and guided to the exposer (3) through a stationary lens (34) and a fourth stationary reflecting mirror (35), after passing a slit (33) and being reflected at right angles respectively at the first, second and third reflecting mirrors (23), (26), (27).

Numerals (36), (37), (38) denote a home position photo interrupter (hereinafter, photo interrupter is referred to as PI) for detecting the home position, a brake timing PI and a paper feed timing PI respectively, which are installed immovably in order along the running path of the running optical system (28), and respond to a shield piece (39) disposed in the lighting unit of the running optical system. The home position PI (36) presents a reference position of the running optical system (28), the brake timing PI (37) applies braking to the running optical system (28) and the paper feed timing PI (38) adjusts the timing for conveying the transferring paper from the resist roller (16) toward the photoreceptor drum (1).

FIG. 13 is a partially exploded perspective view showing the running optical system (28) and its associated portions specifically. In FIG. 13, (43) is a first moving frame having the lighting unit (19) shown in FIG. 13 and (44) is a second moving frame having the mirror unit (25), which are both engaged slidably to a rod (45) at one end. On one end of the first moving frame (43), a driving wire (46) is secured by a metal piece (47) and screws (48), (49). On one end of the second moving frame (44), there is provided a pulley (50), to which the driving wire (46) is wound by one turn. The driving wire (46) is stretched between fixed portions (51), (52) via pulleys (50), (53), (54), (55), (56). The pulley (55) is mounted to a motor shaft (not shown) and serves as the driving pulley. The pulley (54) gives tension to the driving wire (46). Shafts of the pulleys (53), (56) are fixed to the copying machine body. The first and second moving frames (43), (44) reciprocate in a direction (F) by movement of the wire. Numerals (57), (58) indicate fixing means for fixing ends of the rod (45) to the copying machine body. Rail (59) is a rail supporting the other ends of the first and second moving frames (43), (44) slidably.

Numeral (60) denotes a PI for forced return, also shown in FIG. 12, which is stationary and responds to the shield piece (39) of the optical system (28). In general, the return operation of the running optical system (28) is effected automatically when a count value of a timer counter has reached a timer value set in the resist timer responsive to the copy size selected by an operation panel of the electrophotographic copying machine, thus the PI for forced return (60) is disposed only for the sake of safety.

The running optical system (28) moves toward the right from the home position PI (36) as the starting point, and conveys the transferring paper toward the photoreceptor drum (1) from the resist roller (16) by the paper feed timing PI (38). When the count value of the timer counter has reached the timer value responsive to the copy size set through the operation panel key (not shown), the running optical system (28) is returned, and when arriving at the brake timing PI (37), the braking is applied to stop at the home position PI (36). Thereafter, the same operations are repeated.

In the aforesaid configuration, there is also such prior art that the brake timing is designated by the timer counter without installing the brake timing PI (37).

As described hereinabove, though the brake timing during the return operation in the prior art is effected by the brake timing PI output or decided by the timer counter output, positions concerning brake timing in these cases are all fixed.

However, since the braking capacity changes relatively when the weight of the running optical system varies due to its replacement, or when the moving load is changed due to stains of the rod (45) or rail (59), an accurate stop at the home position can not be achieved by fixed brake timing.

Furthermore, ordinary running operations continued forcibly when the moving load of the running optical system increases extremely due to secular or sudden stains incurred by the component members of the running path such as the rod (45) or rail (59), and this may cause damage to the running optical system and running path.

SUMMARY OF THE INVENTION

Therefore, it is an object of the present invention to provide an image forming apparatus wherein a running optical system is designed to stop accurately at a home position even when the weight and moving load of the running optical system have changed.

It is another object of the present invention to provide an image forming apparatus wherein damage of the running optical system and running path are prevented from occurring.

According to one feature of the present invention, there is provided an image forming apparatus which comprises:
- a movable optical system for reading an original image,
- a motor for driving said optical system,
- a motor driving circuit,
- an encoder which outputs signals responsive to velocities of the motor,
- a control circuit which controls the motor driving circuit such that the optical system starts from a home position and turns at a predetermined point to return again to the home position, and, applies braking to the motor as the optical system approaches the home position, and
- brake timing deciding means for deciding timing to apply braking in response to an output of the encoder.

According to the feature, the optical system can be stopped accurately at the home position. Since the brake timing responsive to the moving load at starting of the optical system can be set by the feature even when the moving load is increased by replacement of the optical system with a heavier one, or by worsened stains of the rod, accurate stop at the home position can be realized.

According to another feature of the present invention, there is provided an image forming apparatus which comprises:
- a movable optical system for reading an original image,
- a motor for driving said optical system,
- a motor driving circuit,
- an encoder which outputs signals responsive to velocities of the motor,
- a phase comparator which compares the encoder output with a reference value to output an error signal,
- a control circuit which controls the motor driving circuit such that the optical system which has departed from a home position and arrived at a given velocity runs through an image reading region at the given velocity, and thereafter turns at a predetermined point to return again to the home position, and gives a control signal in response to an output of the phase comparator to the motor driving circuit while running through the image reading region,
- judging means for judging whether or not the signal dependent on the output of the phase comparator when running through the image reading region exceeds a threshold value decided in advance, and
- means for taking special action against movement of the optical system in response to an output of the judging means by a judging signal when the signal has exceeded the threshold value.

According to the feature, abnormalities of the moving load are detected while the optical system is running through the image reading region, and the detected result is reflected on returning of the optical system for suitable actions.

According to a further feature of the present invention, there is provided an image forming apparatus which comprises:
- a stationary optical system for reading an original image,
- an original table which is movable with respect to the optical system,
- a motor for driving the original table,
- a motor driving circuit,
- an encoder which outputs signals responsive to velocities of the motor,
- a control circuit which controls the motor driving circuit such that the original table runs from a start position and turns at a predetermined point to return again to the start position, and applies braking as it approaches the start position, and
- brake timing deciding means for deciding the timing to apply braking responsive to an output of the encoder.

According to the feature, in an image forming apparatus of the type where the optical system is stationary and the original table is movable, since braking can be applied properly when the original table is stopped, it can be stopped at a given position.

BRIEF DESCRIPTION OF THE DRAWINGS

These and other objects and features of the present invention will become apparent from the following description taken in conjunction with preferred embodiments thereof with reference to the accompanying drawings, wherein like parts are designated by like reference numerals, and in which.

DETAILED DESCRIPTION OF THE PREFERRED EMBODIMENTS

Figure 1:
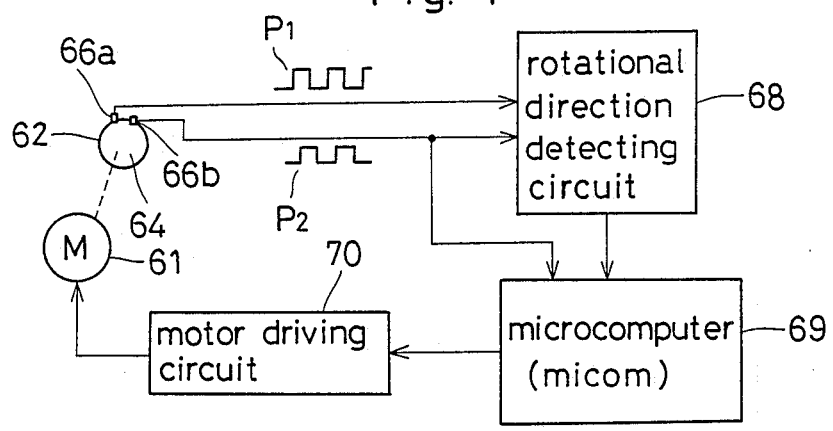
FIG. 1 is a circuit block diagram of an image forming apparatus embodying the present invention.
Figure 3A:
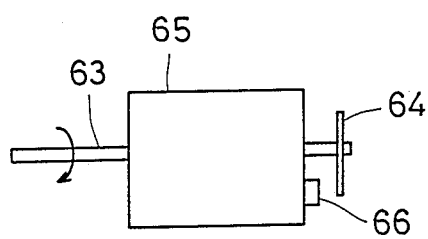
FIG. 3(b) is a view showing its slit disc.
Figure 3B:
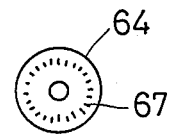
Figure 12:
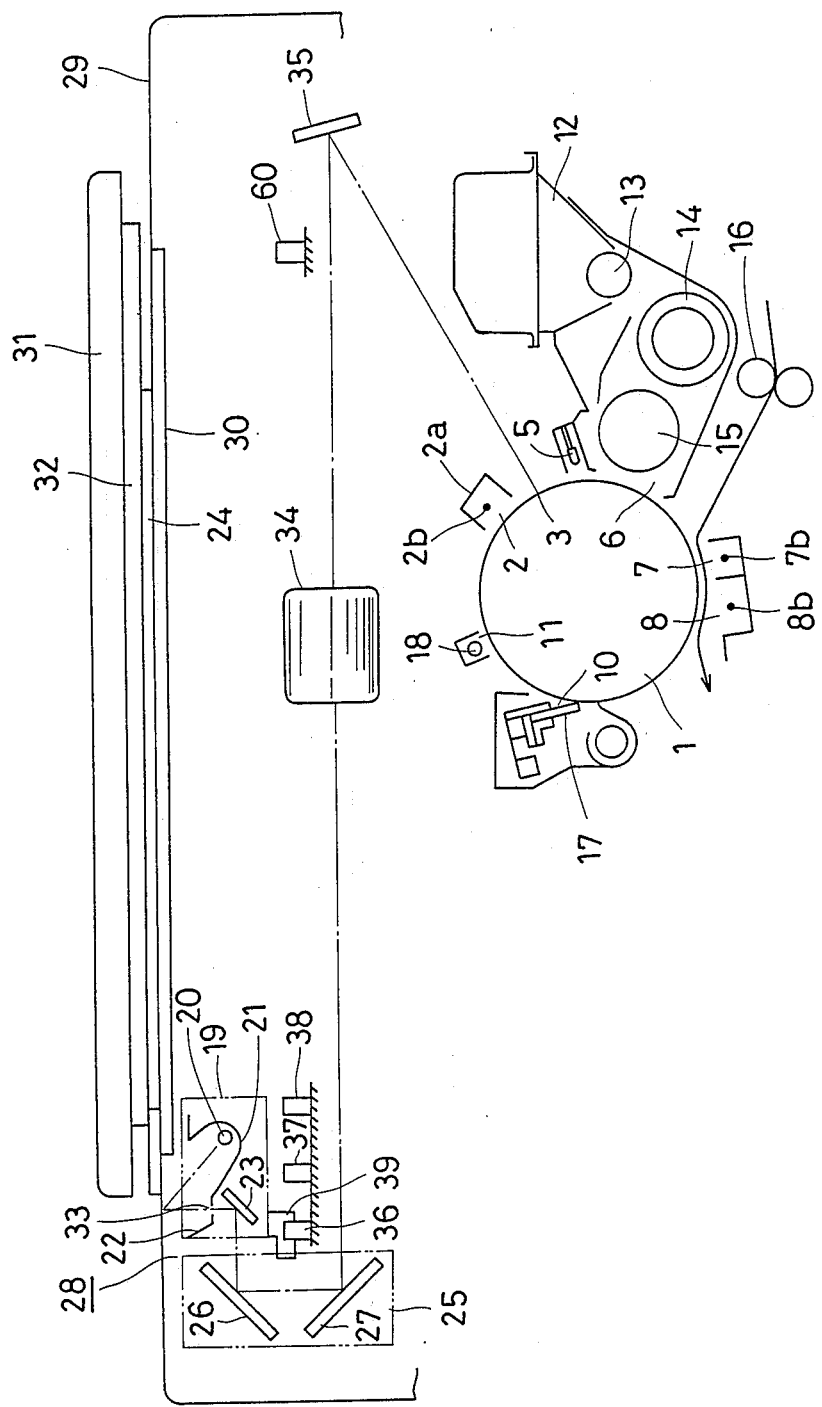
FIG. 12 is a schematic view of a conventional electrophotographic copying machine.
Figure 13:
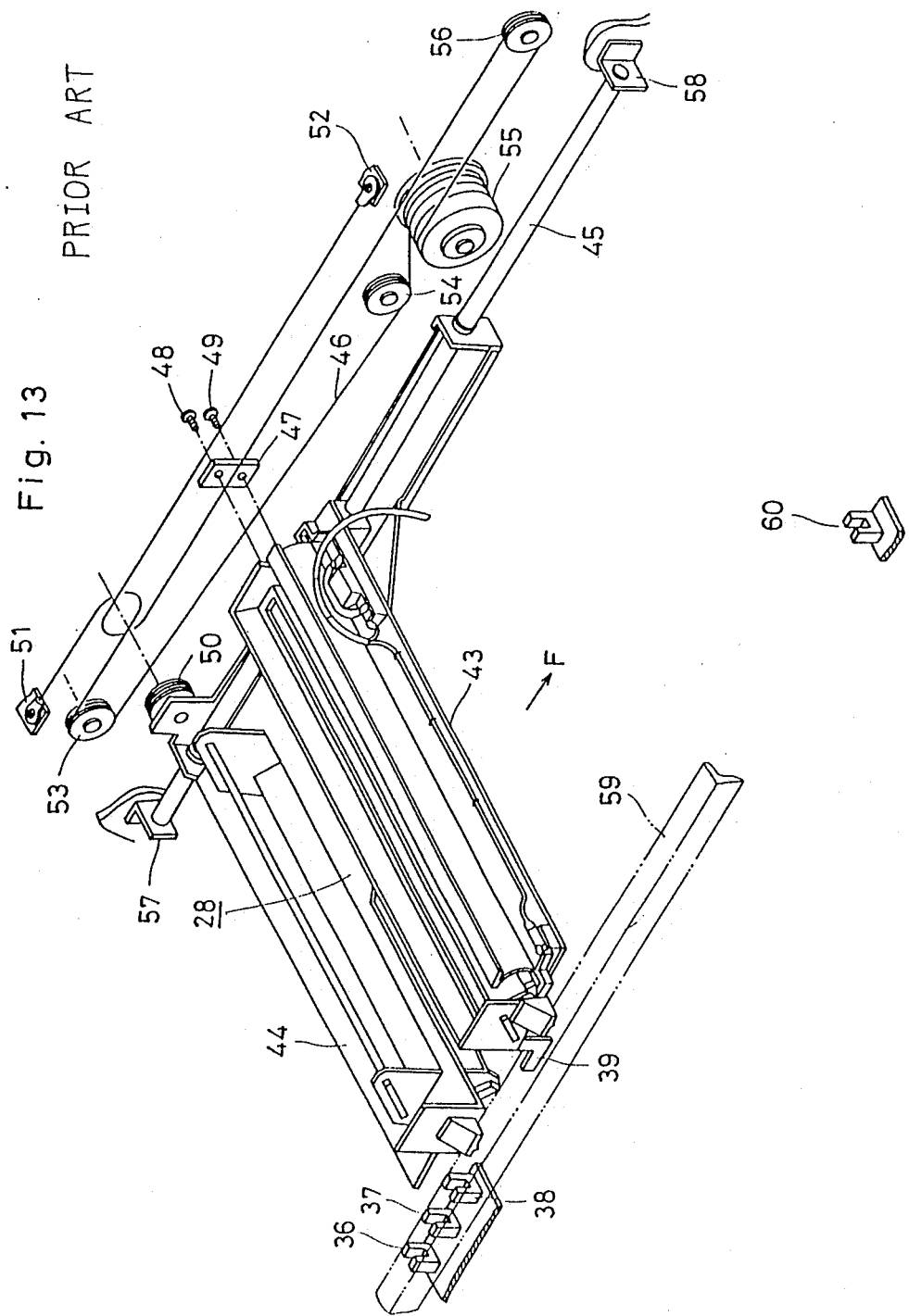
FIG. 13 is an exploded perspective view of portions of the machine of FIG. 12.

In FIG. 1, there is provided an encoder (62) which outputs pulses responsive to velocities of a motor (61) driving an optical system (28) (see FIGS. 12 and 13). The encoder (62) comprises a slit disc (64) fixed to a motor shaft (63) and a sensor (66) mounted on a motor frame (65) as shown in FIG. 3(a). The sensor (66) is constituted by a photo coupler or the like and generates pulses at every passage of slits (67) made in the slit disc (64) shown in FIG. 3(b). As shown in FIG. 1, the sensor (66) comprises first and second sensors (66a) (66b) disposed which are separately and which generate pulses ($P_1$), ($P_2$) having a phase difference of 90° when the motor is at the normal revolution velocity. From the sensors (66a), (66b), 400 pulses are generated per one revolution of the motor at its normal revolution velocity. Output pulses ($P_1$), ($P_2$) of the first and second sensors (66a), (66b) are given to a rotational direction detecting circuit (68) to determine whether the rotation is normal or in a reverse direction.

The determined output is given to a microcomputer (69) (hereinafter referred to as micom).

At the same time, the output pulse ($P_2$) of the second sensor (66b) is also given directly to the micom (69). In this case, in place of the output pulse ($P_2$) of the second sensor (66b), the output pulse ($P_1$) of the first sensor (66a) may be given to the micom (69). The micom (69) counts output pulses ($P_2$) of the second sensor (66b) by a counter to watch the present position of the running optical system (28), and at the same time, obtains the present velocity from repetitive periods of the pulse. Moreover, it decides the brake timing during return operations as to be described later.

Figure 2:
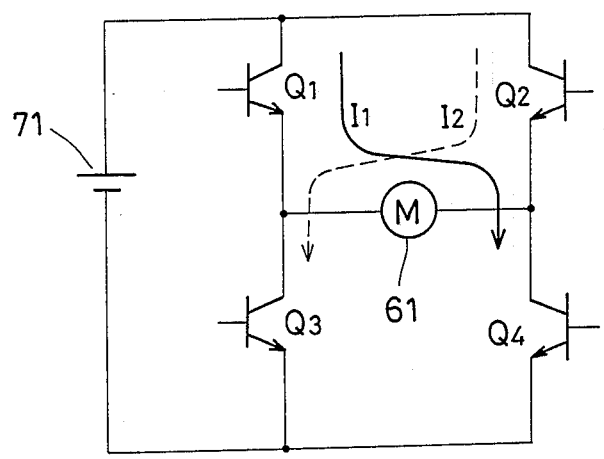
FIG. 2 is a circuit diagram of circuit for use in the embodiment of FIG. 1, FIG. 3 (a) is a side view of an encoder which outputs signals responsive to velocities of a motor in the embodiment of FIG. 1.

Numeral (70) indicates a motor driving circuit consisting of four transistors ($Q_1$)-($Q_4$) connected to a DC power source (71) as shown in FIG. 2. Control signals applied to bases of the transistors ($Q_1$)-($Q_4$) are given from the micom (69). When the motor (61) is rotated normally, the transistors ($Q_1$), ($Q_4$) are ON and ($Q_2$), ($Q_3$) are OFF to allow current ($I_1$) to flow, and when rotated reversely, the transistors ($Q_2$), ($Q_3$) are ON and ($Q_1$), ($Q_4$) are OFF to allow current ($I_2$) to flow reversely. When braking is applied during the reverse rotation, the same current ($I_1$) as the normal rotation will flow.

When scanning the original, the running optical system (28) moves toward the right in FIG. 12, this direction is defined as "forward" and the reverse direction as "return".

Figure 4:
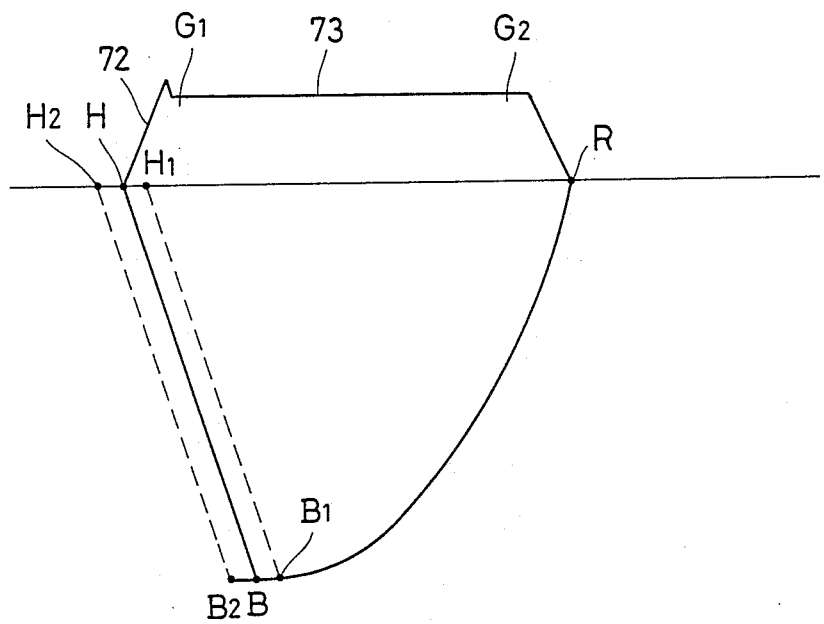
FIGS. 4 and 5 are useful for illustrating operation of the embodiment of FIG. 1.

Now, in FIG. 4, though the running optical system (28) which starts from the home position (H) enters a constant velocity region (73) via a forward build-up portion (72), in the constant velocity region (73) there is present an image reading region which starts at ($G_1$) and ends at ($G_2$). At the return position (R), since the reverse current ($I_2$) is supplied to the motor (61) in place of the normal current ($I_1$), the motor (61) is reversed rapidly to bring the running optical system (28) to the returning state. Here, in order to stop the running optical system (28) correctly at the home position (H), the brake timing or braking point (B) must be set correctly. It is because that, when braking is applied at the point ($B_1$) earlier than the correct braking point (B), the running optical system (28) stops at ($H_1$) before the home position (H), conversely, when braking is applied at ($B_2$) later than the point (B), it stops at ($H_2$) after the home position (H).

Figure 5:
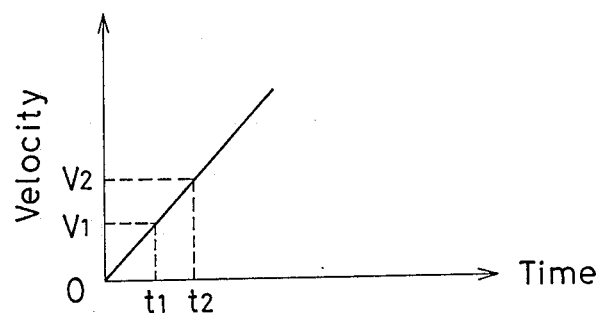

In the present embodiment, the braking point or brake timing is set as follows. First, as shown in FIG. 5, velocities ($V_1$), ($V_2$) of the motor (61) at least at two points ($t_1$), ($t_2$) are obtained in the micom (69) in response to the output pulse ($P_2$) of the second sensor (66b) during forward build-up. Angular velocity may be obtained as the velocity in this case. Next, the acceleration ($\alpha$) of the motor (61) at the forward build-up is obtained in response to the velocities ($V_1$), ($V_2$) and times ($t_1$), ($t_2$) In response to the acceleration, the brake timing or braking point (B) is calculated. This is based upon the understanding that there is a constant analogous relationship between the capacities of the motor (61) to start (acceleration $\times$ mass) and stop the running optical system (28). The motor (61) rotates at its full capacity at the forward build-up and also functions with full power at braking.

The brake timing thus decided is provided on the control signal given to the motor driving circuit (70) from the micom (69). That is, the timing for switching from the reverse current ($I_2$) flow to normal current ($I_1$) flow during the return movement shown in FIG. 2 is effected by the brake timing decided as aforementioned.

In the present embodiment, though it is so constituted that calculation of the acceleration and determination of the brake timing aforementioned are effected at every moving operation of the running optical system (28), it is not limited thereto, it may be effected at everY given moving frequency of the running optical system (28).

Figure 6:
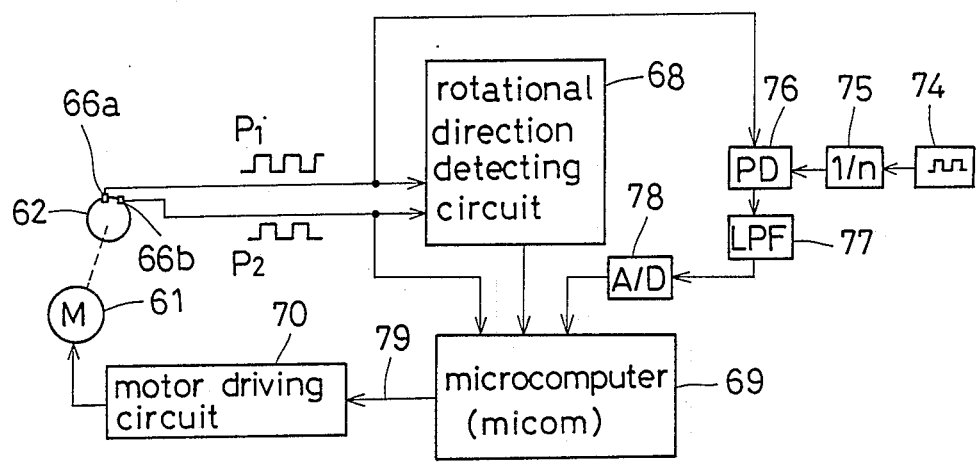
FIG. 6 is a circuit block diagram of an image forming apparatus according to another embodiment of the present invention.

Next, the embodiment shown in FIG. 6 will be explained. In the embodiment, the output pulse ($P_1$) of the first sensor (66a) is given not only to the rotational direction detecting circuit (68) but also to the phase comparator (76) for phase comparison with a reference pulse. The reference pulse is given from a pulse oscillator (74) through a frequency divider (75). An error signal which is the output from the phase comparator (76) is taken into the micom (69) successively through a low-pass filter (77) and an A/D converter (78). The micom (69) gives a pulse width modulation (hereinafter, referred to as PWM) signal to the motor driving circuit (70) in response to the error signal only when the running optical system (28) is running through the image reading region. Thus, during this period, a phase locked loop is formed by the encoder (62), phase comparator (76), micom (69) and driving circuit (70) and the revolution velocity of the motor (61) is controlled to bring the error signal to 0. Thereby, the velocity of the running optical system (28) is kept constant while running through the image reading region. At this time, signal data dependent on the phase error signal is retained in the micom (69) and used in deciding the brake timing as to be described later.

Control signals given to bases of the transistors ($Q_1$)-($Q_4$) of FIG. 2 constituting the motor driving circuit (70) are PWM signals given from the micom (69).

Figure 7:
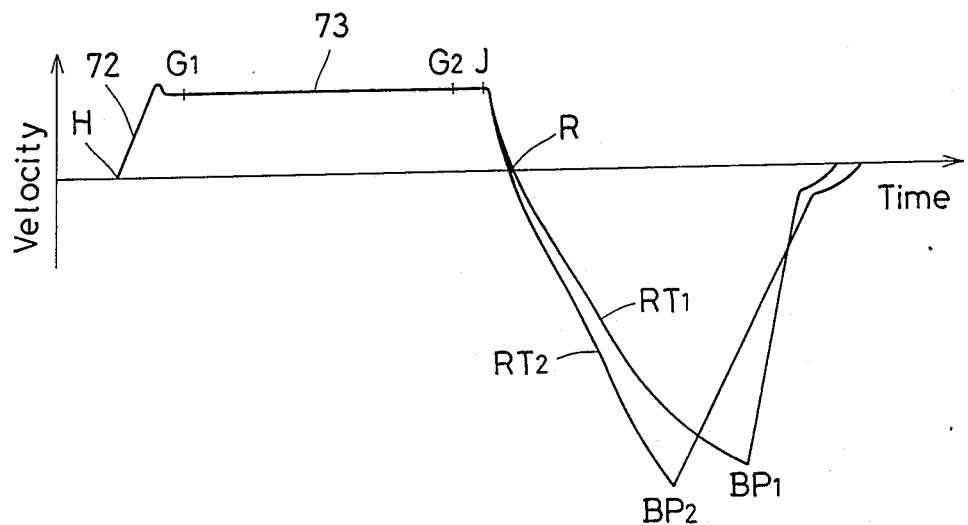
FIGS. 7, 8 and 9 are useful for illustrating operation of the embodiment of FIG. 6, FIGS. 10 and 11 are flow charts showing operational flows of the device, of FIG. 6.
Figure 8:
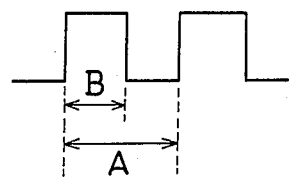

Now, in FIG. 7, though the running optical system (28) which starts from the home position (H) enters the constant velocity region (73) via the forward build-up portion (72), in the constant velocity region (73), there is present the image reading region which starts ($G_1$) and ends at ($G_2$). Since the reverse current ($I_2$) is supplied to the motor (61) at the return position (R) in place of the normal current ($I_1$), the motor (61) is reversed rapidly to bring the running optical system (28) to the returning state. Here, in order to stop the running optical system (28) correctly at the home position (H), the brake timing or braking point must be set correctly. In the present embodiment, the braking point or brake timing is set as follows. First, the micom (69) outputs the PWM signal as shown in FIG. 8 to a line (79) response to the error signal from the phase comparator (76) given through the A/D converter (78) when the running optical system (28) is running through the image reading region ($G_1$)–($G_2$) as aforementioned. In the present invention, observing the fact that a duty B/A of the PWM signal changes responsive to the moving load, values of the duty B/A are checked one by one and as far as they are within the threshold value decided previously. The average is taken as the basis for setting the braking point shown in FIG. 7. At this time, when the moving load is larger on the average, the return characteristic becomes ($RT_1$) and when smaller it becomes ($RT_2$), so that respective proper braking points become ($BP_1$) and ($BP_2$). The braking points are calculated by the micom (69) in response to the average value.

The brake timing decided as aforementioned is provided on the control signal given to the motor driving circuit (70) from the micom (69). That is, the timing for switching from the reverse current ($I_2$) flow to the normal current ($I_1$) flow during a return movement as shown in FIG. 2 is effected by the braking point.

Signal data for the brake timing may be formed by watching the intensity of the current ($I_1$) which is the output of the driving circuit (70) in lieu of watching the duty of the PWM signal aforementioned. In such a case, the current value is given to the micom (69) after A/D conversion. The digital signal inputted to the micom (69) from the A/D converter (78) may be watched in place of the PWM signal to form the signal data.

Figure 10:
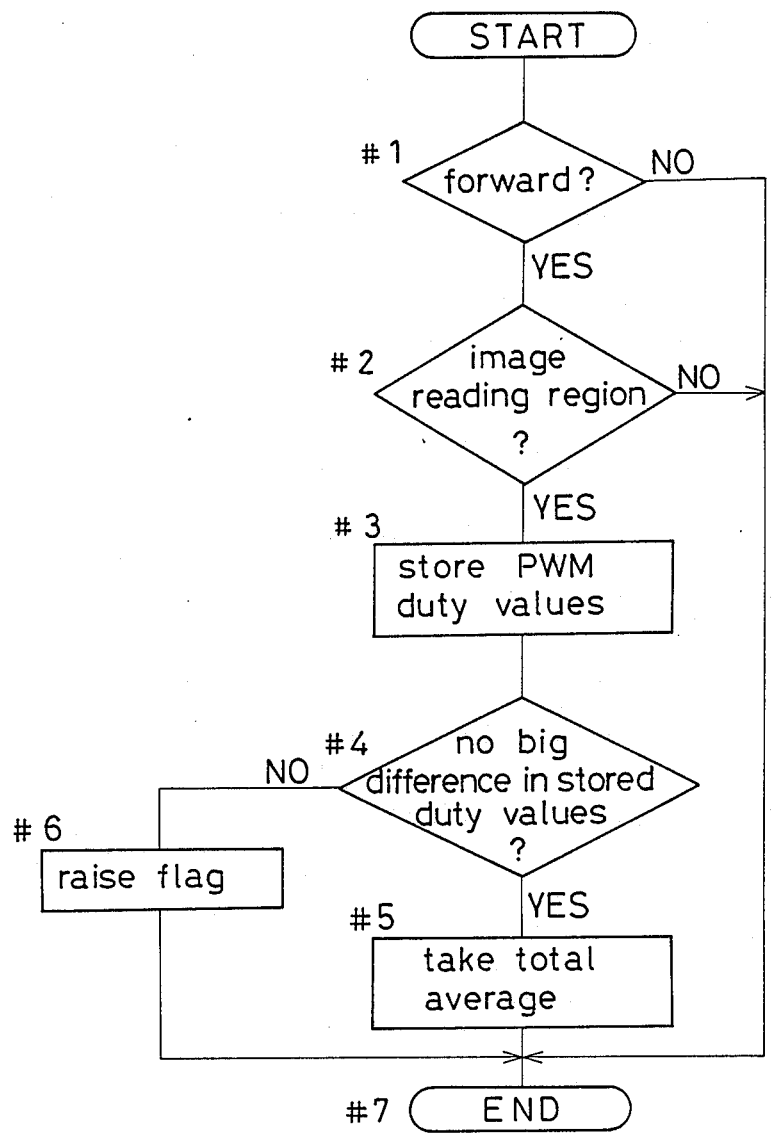
Figure 11:
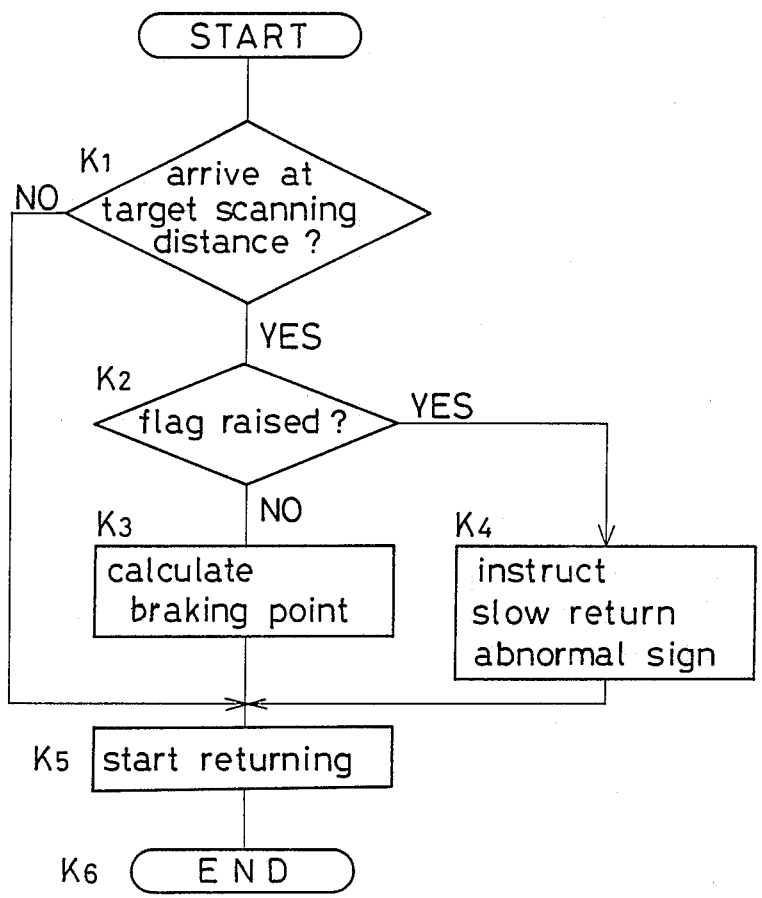

Next, a flow chart of FIG. 10 showing checkings of the moving load and calculating operations of its average data, and a flow chart of FIG. 11 showing deriving operations of the braking point will be explained.

First, in FIG. 10, it is determined in Step (#1) whether the running optical system (28) is in forward running, if No, operation proceeds to Step (#7) to complete the flow, if Yes, it is determined in Step (#2) whether the running optical system (28) is in the image reading region ($G_1$)–($G_2$). Here, if No, operation skips to Step (#7) and if Yes, operation proceeds to Step (#3) to store duty values of the PWM signal in the memory one by one. Then, in Step (#4), it is checked whether there is no big difference in each stored value, specifically, by checking whether any of the duty values exceeds the threshold value fixed in advance. When it is determined that there is a big difference (some duty values exceed the threshold value), a flag is raised in Step (#6) to show it. When it is determined that there is no big difference, the average value of whole duty values stored in Step (#5) is obtained to finish the operation flow.

In the operation flow of FIG. 11, it is determined in Step ($K_1$) whether the running optical system (28) has arrived at a predetermined location. The predetermined location is indicated as a point (J) in FIG. 7. When the running optical system (28) has arrived at the point (J), it has been checked whether a flag is raised in Step ($K_2$). This flag is the one raised in Step (#6) of FIG. 10 aforementioned. If the flag is not raised, a brake starting point corresponding to the average value is calculated in Step ($K_3$). If the flag is raised, proceeds to Step ($K_4$) to instruct such an action against abnormality. As the action, for example, slow return is instructed, and at the same time, the abnormal sign is indicated by an indicating means. In substitution, if a mechanism for dropping a lubricant onto the rod (45) or rail (59) on which the running optical system (28) slides is provided, a maintenance free apparatus can be realized. Alternatively, the returning operation may be stopped and just the abnormality indicated for maintenance. After either of Steps ($K_3$), ($K_4$), the return operation is started in Step ($K_5$) and the operation flow is finished in Step ($K_6$).

Figure 9:
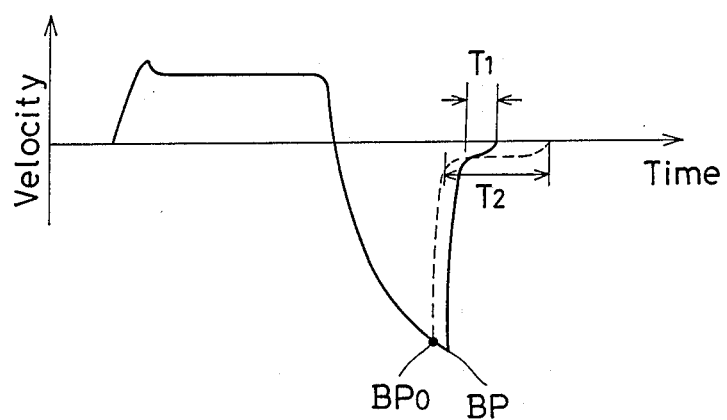

FIG. 9 shows the case where the return time can be shortened when the abnormality is not detected. That is, conventionally even when the load increases, braking is applied prematurely at the braking point ($BP_0$) decided uniformly, thus the constant low velocity region ($T_2$) before the home position is extended to lengthen the total return time, but in the aforesaid configuration, since the braking point is as late as (BP), the constant low velocity region is entered immediately before the home position, thus the duration of the constant velocity region ($T_1$) is short and the return time ($T_1$) is reduced as a whole.

In the embodiment aforementioned, when the moving load increases and the flag is raised while running forwardly in the image reading region, at least the paper undergoing copying can be copied completely if that region is finished without taking the aforesaid action, which is left for the future.

When the moving load is increased abnormally due to stains on component members of the running path for the optical system, it can be detected and treated suitably, so that damages in the optical system and running path can be prevented from occurring.

In the present embodiment, though the phase locked loop is operated only in the image reading region, it will be appreciated that it may be operated also in the return operation.

According to each embodiment, even when the moving load increases due to worsened stains of the rod, rail and so on constituting the running path for the optical system, the optical system can be stopped accurately at home position since the braking is controlled in response to such conditions.

In an image forming apparatus of the type where the constant low velocity return is effected before the home position in the return operation, the constant velocity return time can be shortened and in general, the total return time can be reduced.

The present invention is applicable not only in an image forming apparatus having a mirror scanning type optical system as described heretofore, but also in those having a moving original table type optical system. That is, in this type of image forming apparatus, though the optical system is stationary and reads the original image on the original table by moving it, the moving original table must be stopped at a predetermined point just as the aforesaid movable optical system type. In the case of the movable original table type, the subject matter of the present invention would be constituted the same in the movable optical system type, except that the motor would be designed to move the original table in lieu of the optical system.

What is claimed is:

1. An image forming apparatus comprising:
   a movable optical system for reading an original image,
   a motor having a shaft for driving said movable optical system,
   a motor driving circuit,
   an encoder which generates signals indicative of velocities of said motor shaft, and
   a control circuit which controls said motor driving circuit to drive said motor to move said movable optical system from a home position to a predetermined point and from said point to return to said home position, said control circuit controlling said motor driving circuit to brake said motor as said movable optical system approaches said home position, said control circuit comprising timing deciding means, responsive to shaft velocity signals from said encoder, for calculating an acceleration of said motor shaft as said motor accelerates said optical system from said home position toward said predetermined point and for deciding timing for braking said motor based upon said calculated acceleration.

2. An image forming apparatus according to claim 1, wherein said control circuit comprises a microcomputer.

3. An image forming apparatus according to claim 2, wherein said movable optical system is a mirror scanning type running optical system.

4. An image forming apparatus according to claim 1, wherein said movable optical system is a mirror scanning type running optical system.

5. An image forming apparatus comprising:
   a movable optical system for reading an original image,
   a motor having a shaft for driving said movable optical system,
   a motor driving circuit,
   an encoder which generates signals indicative of velocities of said motor shaft
   a phase comparator which compares a shaft velocity signal from said encoder with a reference signal and provides an error signal representative of a difference between said shaft velocity signal and said reference signal, and
   a control circuit for generating a control signal which controls said motor driving circuit to drive said motor to move said movable optical system from a home position until said optical system attains a given velocity and to move said optical system through an image reading region at said given velocity, said control circuit generating its control signal while said optical system moves through said image reading region, said control circuit including brake timing deciding means which decides brake timing based upon signal data dependent on an error signal from said phase comparator, said control circuit generating its control signal based upon brake timing decided by said brake timing deciding means.

6. An image forming apparatus according to claim 5, wherein said movable optical system is a mirror scanning type running optical system.

7. An image forming apparatus according to claim 5, wherein said control circuit comprises a microcomputer.

8. An image forming apparatus according to claim 5, wherein said signal data is representative of a duty of a pulse width modulation signal generated by said control circuit as its control signal.

9. An image forming apparatus according to claim 5, wherein said signal data is representative of a current value of said motor driving circuit.

10. An image forming apparatus according to claim 5, comprising judging means for judging whether signal data dependent on an error signal from said phase comparator exceed a threshold value decided in advance, and providing an output signal indicative thereof, and
    means for taking special action against movement of said movable optical system in response to an output signal from signal from said judging means which indicates that said signal data exceed said threshold value.

11. An image forming apparatus according to claim 10, wherein said special action is to return said movable optical system slowly.

12. An image forming apparatus according to claim 10, wherein said special action is to indicate an abnormal condition in addition to slowly returning said movable optical system.

13. An image forming apparatus according to claim 10, wherein said special action is to drop a lubricant on component members of a running path of said movable optical system.

14. An image forming apparatus according to claim 13, wherein one of said component members of the running path is a rod to which a moving frame of said movable optical system is slidably engaged.

15. An image forming apparatus according to claim 13, wherein another component member of the running path is a rail which slidably supports a moving frame of said movable optical system.

16. An image forming apparatus according to claim 10, wherein a component member of a running path of said movable optical system is a rod to which a moving frame of said movable optical system is slidably engaged.

17. An image forming apparatus according to claim 16, wherein another component member of the running path is a rail which slidably supports a moving frame of said movable optical system.

* * * * *